(12) United States Patent
Glaug (10) Patent No.: US 7,962,993 B2
(45) Date of Patent: Jun. 21, 2011

(54) SURFACE CLEANING PAD HAVING ZONED ABSORBENCY AND METHOD OF MAKING SAME

(75) Inventor: Frank S. Glaug, Chester Springs, PA (US)

(73) Assignee: First Quality Retail Services, LLC, Great Neck, NY (US)

( * ) Notice: Subject to any disclaimer, the term of this patent is extended or adjusted under 35 U.S.C. 154(b) by 0 days.

(21) Appl. No.: 11/240,726

(22) Filed: Sep. 30, 2005

(65) Prior Publication Data

US 2007/0078421 A1   Apr. 5, 2007

(51) Int. Cl.
*A47L 25/00* (2006.01)
*A61F 13/15* (2006.01)
*A61F 13/20* (2006.01)

(52) U.S. Cl. ............. 15/228; 15/118; 604/367; 604/368

(58) Field of Classification Search .................. 604/289, 604/290, 368; 104/208; 15/118, 228
See application file for complete search history.

(56) References Cited

U.S. PATENT DOCUMENTS

| | | | |
|---|---|---|---|
| 869,842 A | 10/1907 | Hill | |
| 916,755 A | 3/1909 | Moseke | |
| 1,002,268 A | 9/1911 | Hayden | |
| 1,205,979 A | 11/1916 | Dohm | |
| 1,742,318 A | 1/1930 | Newton et al. | |
| 2,136,827 A | 11/1938 | Schur | |
| 2,301,505 A | 11/1942 | Bates | |
| 2,478,148 A | 8/1949 | Wilson et al. | |
| 2,581,069 A | 1/1952 | Bertolet, Jr. | |
| 2,733,468 A | 2/1956 | Haber | |
| 2,739,334 A | 3/1956 | Hardey | |
| 2,755,498 A | 7/1956 | Park | |
| 2,764,774 A | 10/1956 | Belsky et al. | |
| 2,777,148 A | 1/1957 | Belsky et al. | |
| 2,816,313 A | 12/1957 | Beck et al. | |
| 2,853,730 A | 9/1958 | Belsky et al. | |
| 2,916,759 A | 12/1959 | Smith | |
| 2,958,146 A | 11/1960 | Van Dusen, Jr. et al. | |
| 3,012,264 A | 12/1961 | Nash | |
| 3,015,834 A | 1/1962 | Marrinson et al. | |
| 3,025,202 A | 3/1962 | Morgan et al. | |
| 3,077,627 A | 2/1963 | Ashworth | |
| 3,099,855 A | 8/1963 | Nash | |
| 3,196,475 A | 7/1965 | Brown | |
| 3,199,136 A | 8/1965 | George | |
| 3,221,356 A | 12/1965 | Schirmer | |
| D205,500 S | 8/1966 | Deitel et al. | |
| 3,271,231 A | 9/1966 | Moggio et al. | |
| 3,362,037 A | 1/1968 | Griffin | |
| 3,395,415 A | 8/1968 | Leland | |
| 3,395,416 A | 8/1968 | Hughes | |
| 3,395,418 A | 8/1968 | Malmo | |
| 3,412,418 A | 11/1968 | Griffin | |
| 3,425,085 A | 2/1969 | Moss | |
| 3,449,784 A | 6/1969 | Moss | |

(Continued)

*Primary Examiner* — Melanie J Hand
(74) *Attorney, Agent, or Firm* — Amster, Rothstein & Ebenstein LLP (57) ABSTRACT

A floor cleaning pad is provided having a pad body comprising a cleaning surface configured for contact with a floor to be cleaned and an opposed surface configured to be coupled to a floor cleaning implement. The cleaning surface and the opposed surface defining a thickness of the pad body and superabsorbent polymer particles maintained within a zone of the pad body, and the zone of the superabsorbent polymer particles occupying a portion of the thickness and an area less than an area of the cleaning surface.

21 Claims, 5 Drawing Sheets

U.S. PATENT DOCUMENTS

| | | |
|---|---|---|
| 3,473,184 A | 10/1969 | Buck, Jr. |
| 3,501,813 A | 3/1970 | Lee et al. |
| 3,528,076 A | 9/1970 | Anderson |
| 3,528,120 A | 9/1970 | Lindstrom |
| 3,545,876 A | 12/1970 | Leland |
| 3,581,706 A | 6/1971 | Rasmussen et al. |
| 3,593,359 A | 7/1971 | Strauss et al. |
| 3,680,170 A | 8/1972 | Sims |
| 3,692,622 A | 9/1972 | Dunning |
| 3,698,030 A | 10/1972 | Lockett |
| 3,711,886 A | 1/1973 | Strauss |
| 3,713,744 A | 1/1973 | Sims |
| 3,717,905 A | 2/1973 | Furbeck |
| 3,720,976 A | 3/1973 | Bailey |
| 3,733,234 A | 5/1973 | Dunning |
| 3,737,938 A | 6/1973 | Saltzstein |
| 3,760,450 A | 9/1973 | Griffin et al. |
| 3,761,991 A | 10/1973 | Moss |
| 3,764,451 A | 10/1973 | Dunning |
| 3,776,807 A | 12/1973 | Dunning et al. |
| 3,792,505 A | 2/1974 | Saltzstein |
| 3,825,381 A | 7/1974 | Dunning et al. |
| 3,827,100 A | 8/1974 | Griffin et al. |
| 3,836,346 A | 9/1974 | Stalego |
| 3,860,002 A | 1/1975 | Kolbach |
| 3,877,103 A | 4/1975 | Nash |
| 3,896,518 A | 7/1975 | Von Post et al. |
| 3,945,736 A | 3/1976 | Rittenbaum et al. |
| 3,964,213 A | 6/1976 | Tobey |
| 3,965,519 A | 6/1976 | Hermann |
| 3,966,519 A | 6/1976 | Mitchell et al. |
| 3,973,291 A | 8/1976 | Kolbach |
| 3,976,734 A | 8/1976 | Dunning et al. |
| 3,978,541 A | 9/1976 | Gustafsson |
| 3,991,431 A | 11/1976 | Thielen |
| 3,991,432 A | 11/1976 | Griffin et al. |
| 3,996,639 A | 12/1976 | Griffin et al. |
| 4,007,510 A | 2/1977 | Scoggin, Jr. et al. |
| 4,016,628 A | 4/1977 | Kolbach |
| 4,027,672 A | 6/1977 | Karami |
| 4,032,239 A | 6/1977 | Maupin |
| 4,070,726 A | 1/1978 | Joffre |
| 4,071,983 A | 2/1978 | Thielen |
| 4,074,959 A | 2/1978 | Curry et al. |
| 4,087,506 A | 5/1978 | Cook et al. |
| 4,095,007 A | 6/1978 | Marshall |
| 4,099,288 A | 7/1978 | Rittenbaum et al. |
| 4,106,153 A | 8/1978 | Lemelson |
| 4,114,223 A | 9/1978 | Buchanan |
| 4,114,224 A | 9/1978 | Disko |
| RE29,789 E | 10/1978 | Kolbach |
| 4,141,772 A | 2/1979 | Buell |
| 4,153,664 A | 5/1979 | Sabee |
| 4,184,224 A | 1/1980 | Joffre |
| 4,193,751 A | 3/1980 | Miller |
| 4,212,302 A | 7/1980 | Karami |
| 4,213,459 A | 7/1980 | Sigl et al. |
| 4,217,078 A | 8/1980 | Buell |
| 4,219,899 A | 9/1980 | Zurawin et al. |
| 4,223,063 A | 9/1980 | Sabee |
| 4,225,998 A | 10/1980 | Thielen |
| 4,252,761 A | 2/1981 | Schoggen et al. |
| 4,264,289 A | 4/1981 | Day |
| 4,268,340 A | 5/1981 | Fitzgerald et al. |
| 4,351,793 A | 9/1982 | Day |
| 4,375,447 A | 3/1983 | Chung |
| 4,375,448 A | 3/1983 | Appel et al. |
| 4,377,230 A | 3/1983 | Bürkner |
| 4,388,056 A | 6/1983 | Lee et al. |
| 4,429,001 A | 1/1984 | Kolpin et al. |
| 4,435,234 A | 3/1984 | Hunt |
| 4,516,360 A | 5/1985 | Gringer et al. |
| 4,516,361 A | 5/1985 | Gringer |
| 4,551,191 A | 11/1985 | Kock et al. |
| 4,562,610 A | 1/1986 | Davis et al. |
| 4,564,969 A | 1/1986 | Heinonen |
| 4,575,891 A | 3/1986 | Valente |
| 4,583,486 A | 4/1986 | Miller |
| 4,585,448 A | 4/1986 | Enloe |
| 4,592,708 A | 6/1986 | Feist et al. |
| 4,598,441 A | 7/1986 | Stemmler |
| 4,600,458 A | 7/1986 | Kramer et al. |
| 4,601,938 A | 7/1986 | Deacon et al. |
| 4,603,069 A | 7/1986 | Haq et al. |
| 4,610,678 A | 9/1986 | Weisman et al. |
| D287,173 S | 12/1986 | Libman |
| 4,640,810 A | 2/1987 | Laursen et al. |
| 4,650,480 A | 3/1987 | Stemmler |
| 4,678,527 A | 7/1987 | Ulman |
| 4,685,167 A | 8/1987 | Murray |
| 4,685,915 A | 8/1987 | Hasse et al. |
| 4,698,871 A | 10/1987 | Patkos |
| 4,712,268 A | 12/1987 | Heinonen |
| 4,732,797 A | 3/1988 | Johnson et al. |
| 4,750,233 A | 6/1988 | Swain |
| 4,761,258 A | 8/1988 | Enloe |
| 4,764,325 A | 8/1988 | Angstadt |
| 4,765,780 A | 8/1988 | Angstadt |
| 4,769,267 A | 9/1988 | Hoyt |
| 4,769,283 A | 9/1988 | Sipinen et al. |
| 4,784,892 A | 11/1988 | Storey et al. |
| 4,793,019 A | 12/1988 | Stima et al. |
| 4,797,310 A | 1/1989 | Barby et al. |
| 4,808,474 A | 2/1989 | Sipinen |
| 4,811,449 A | 3/1989 | Kobayashi |
| 4,812,283 A | 3/1989 | Farley et al. |
| 4,813,944 A | 3/1989 | Haney et al. |
| 4,820,579 A | 4/1989 | Aszman |
| 4,823,427 A | 4/1989 | Gibbs et al. |
| 4,834,735 A | 5/1989 | Alemany et al. |
| 4,843,674 A | 7/1989 | Jones |
| 4,852,201 A | 8/1989 | Wundrock et al. |
| 4,852,210 A | 8/1989 | Krajicek |
| 4,859,388 A | 8/1989 | Peterson et al. |
| 4,902,544 A | 2/1990 | Kim et al. |
| 4,902,559 A | 2/1990 | Eschwey et al. |
| 4,904,440 A | 2/1990 | Angstadt |
| 4,908,175 A | 3/1990 | Angstadt |
| 4,927,346 A | 5/1990 | Kaiser et al. |
| 4,927,582 A | 5/1990 | Bryson |
| 4,935,158 A | 6/1990 | Aszman et al. |
| 4,945,599 A | 8/1990 | Flynn |
| D310,589 S | 9/1990 | Paciullo et al. |
| D310,901 S | 9/1990 | Paciullo et al. |
| D310,902 S | 9/1990 | Paciullo et al. |
| D311,318 S | 10/1990 | Ovens |
| 4,961,242 A | 10/1990 | Kresse et al. |
| 4,962,563 A | 10/1990 | Bachar |
| 4,971,471 A | 11/1990 | Sloan |
| 4,987,632 A | 1/1991 | Rowe et al. |
| 4,991,250 A | 2/1991 | Young |
| 4,995,133 A | 2/1991 | Newell |
| 5,004,579 A | 4/1991 | Wislinski et al. |
| 5,012,544 A | 5/1991 | Verry |
| 5,017,324 A | 5/1991 | Kaiser et al. |
| 5,028,224 A | 7/1991 | Pieper et al. |
| 5,028,646 A | 7/1991 | Miller et al. |
| 5,029,357 A | 7/1991 | Gootoff et al. |
| 5,042,105 A | 8/1991 | Buck et al. |
| 5,044,040 A | 9/1991 | Tetrault |
| 5,047,023 A | 9/1991 | Berg |
| 5,064,484 A | 11/1991 | Craig et al. |
| 5,066,527 A | 11/1991 | Newell |
| 5,068,079 A | 11/1991 | Gustafsson |
| 5,071,489 A | 12/1991 | Silvenis et al. |
| 5,087,506 A | 2/1992 | Palumbo |
| 5,090,832 A | 2/1992 | Rivera et al. |
| 5,092,699 A | 3/1992 | Silvenis |
| 5,094,559 A | 3/1992 | Rivera et al. |
| 5,102,585 A | 4/1992 | Pieper et al. |
| 5,115,535 A | 5/1992 | Casademunt Ferre et al. |
| 5,128,082 A | 7/1992 | Makoui |
| 5,138,738 A | 8/1992 | Nicholson |
| 5,143,680 A | 9/1992 | Molnar et al. |
| 5,143,779 A | 9/1992 | Newkirk et al. |
| 5,156,902 A | 10/1992 | Pieper et al. |
| 5,160,331 A | 11/1992 | Forester et al. |

| | | | | | | |
|---|---|---|---|---|---|---|
| 5,165,138 A | 11/1992 | Garabedian | | 5,618,281 A | 4/1997 | Betrabet et al. |
| 5,176,668 A | 1/1993 | Bernardin | | 5,620,432 A | 4/1997 | Goulait et al. |
| 5,177,831 A | 1/1993 | Wirth | | 5,638,569 A | 6/1997 | Newell |
| 5,178,931 A | 1/1993 | Perkins et al. | | 5,672,404 A | 9/1997 | Callahan, Jr. et al. |
| 5,205,012 A | 4/1993 | Coley | | 5,678,278 A | 10/1997 | McBride et al. |
| 5,211,903 A | 5/1993 | Reifenhauser | | 5,681,305 A | 10/1997 | Korpman |
| 5,213,817 A | 5/1993 | Pelley | | 5,707,731 A | 1/1998 | Honeycutt et al. |
| 5,217,787 A | 6/1993 | Monahan | | D391,710 S | 3/1998 | Hanaoka |
| 5,226,991 A | 7/1993 | Svaighert | | D391,711 S | 3/1998 | Hanaoka et al. |
| 5,227,107 A | 7/1993 | Dickenson et al. | | 5,740,578 A | 4/1998 | Moore |
| 5,230,119 A | 7/1993 | Woods et al. | | 5,750,066 A | 5/1998 | Vonderhaar et al. |
| 5,230,843 A | 7/1993 | Howard et al. | | 5,771,524 A | 6/1998 | Woods et al. |
| D338,705 S | 8/1993 | Spokoiny | | 5,804,512 A | 9/1998 | Lickfield et al. |
| 5,248,524 A | 9/1993 | Soderlund | | 5,810,800 A | 9/1998 | Hunter et al. |
| 5,262,223 A | 11/1993 | Palumbo et al. | | 5,815,878 A | 10/1998 | Murakami et al. |
| 5,269,049 A | 12/1993 | Gustafsson et al. | | 5,836,039 A | 11/1998 | Rimer |
| 5,279,854 A | 1/1994 | Kendall et al. | | 5,839,147 A | 11/1998 | Chia-Yi et al. |
| 5,280,664 A | 1/1994 | Lin | | 5,845,361 A | 12/1998 | Murakami et al. |
| 5,288,220 A | 2/1994 | Kugler et al. | | 5,863,565 A | 1/1999 | Rossillon et al. |
| 5,292,239 A | 3/1994 | Zeldin et al. | | 5,885,516 A | 3/1999 | Christensen |
| 5,292,582 A | 3/1994 | Gibbs et al. | | 5,888,006 A | 3/1999 | Ping et al. |
| 5,294,478 A | 3/1994 | Wanek et al. | | D409,343 S | 5/1999 | Kingry et al. |
| 5,304,160 A | 4/1994 | Igaue et al. | | 5,904,674 A | 5/1999 | Bonjour |
| 5,306,453 A | 4/1994 | Shulman | | 5,915,437 A | 6/1999 | Petner |
| 5,308,896 A | 5/1994 | Hansen et al. | | 5,916,507 A | 6/1999 | Dabi et al. |
| 5,330,456 A | 7/1994 | Robinson | | 5,916,670 A | 6/1999 | Tan et al. |
| 5,331,711 A | 7/1994 | Kelly | | 5,922,140 A | 7/1999 | Wills |
| 5,333,347 A | 8/1994 | Stranders | | 5,926,896 A | 7/1999 | Allemann et al. |
| 5,343,587 A | 9/1994 | Findley | | D413,417 S | 8/1999 | Reede |
| 5,348,547 A | 9/1994 | Payne et al. | | 5,937,471 A | 8/1999 | Liao |
| 5,350,370 A | 9/1994 | Jackson et al. | | 5,944,706 A | 8/1999 | Palumbo et al. |
| 5,356,403 A | 10/1994 | Faulks et al. | | 5,953,784 A | 9/1999 | Suzuki et al. |
| 5,372,865 A | 12/1994 | Arakawa et al. | | 5,960,508 A | 10/1999 | Holt et al. |
| 5,378,528 A | 1/1995 | Makoui | | 5,972,265 A | 10/1999 | Marra et al. |
| 5,395,675 A | 3/1995 | Altholz et al. | | D417,050 S | 11/1999 | Reede |
| 5,397,413 A | 3/1995 | Trimble et al. | | 5,988,920 A | 11/1999 | Kunkler et al. |
| 5,410,771 A | 5/1995 | Bereza | | 5,989,478 A | 11/1999 | Ouellette et al. |
| 5,410,772 A | 5/1995 | Lewis | | 5,997,989 A | 12/1999 | Gessner et al. |
| 5,415,650 A | 5/1995 | Sigl | | 6,003,191 A | 12/1999 | Sherry et al. |
| 5,415,717 A | 5/1995 | Perneborn | | 6,004,308 A | 12/1999 | Haddock |
| 5,419,015 A | 5/1995 | Garcia | | 6,006,761 A | 12/1999 | Meledandri |
| 5,422,169 A | 6/1995 | Roe | | D420,561 S | 2/2000 | Kunkler |
| 5,425,725 A | 6/1995 | Tanzer et al. | | 6,020,536 A | 2/2000 | Osterdahl et al. |
| 5,426,809 A | 6/1995 | Muta | | 6,022,818 A | 2/2000 | Welchel et al. |
| 5,429,788 A | 7/1995 | Ribble et al. | | RE36,601 E | 3/2000 | Woods et al. |
| 5,439,364 A | 8/1995 | Gerking et al. | | D423,742 S | 4/2000 | Kingry et al. |
| 5,442,830 A | 8/1995 | Ohm | | 6,045,622 A | 4/2000 | Holt et al. |
| 5,445,777 A | 8/1995 | Noel et al. | | 6,047,435 A | 4/2000 | Suzuki et al. |
| 5,447,677 A | 9/1995 | Griffoul et al. | | 6,048,123 A | 4/2000 | Holt et al. |
| 5,451,442 A | 9/1995 | Pieniak et al. | | 6,048,489 A | 4/2000 | Reiter et al. |
| 5,452,491 A | 9/1995 | Thompson | | D426,039 S | 5/2000 | Tintelnot et al. |
| 5,454,659 A | 10/1995 | Vosbikian et al. | | 6,098,239 A | 8/2000 | Vosbikian |
| 5,461,749 A | 10/1995 | Ahlberg et al. | | 6,098,249 A | 8/2000 | Toney et al. |
| 5,462,537 A | 10/1995 | Carr et al. | | 6,101,661 A | 8/2000 | Policicchio et al. |
| 5,470,653 A | 11/1995 | Honeycutt et al. | | 6,119,298 A | 9/2000 | Kenmochi |
| 5,471,697 A | 12/1995 | Daconta | | 6,127,594 A | 10/2000 | Rosseland |
| 5,471,703 A | 12/1995 | Niven | | 6,141,820 A | 11/2000 | Schmiedhoff et al. |
| 5,477,582 A | 12/1995 | Yamashita | | 6,142,750 A | 11/2000 | Benecke |
| 5,483,720 A | 1/1996 | Decoopman et al. | | 6,143,393 A | 11/2000 | Abe et al. |
| 5,490,905 A | 2/1996 | Huovila et al. | | 6,159,596 A | 12/2000 | Calhoun et al. |
| 5,494,622 A | 2/1996 | Heath et al. | | 6,170,114 B1 | 1/2001 | Woodnorth et al. |
| 5,505,718 A | 4/1996 | Roe et al. | | 6,172,276 B1 | 1/2001 | Hetzler et al. |
| 5,507,065 A | 4/1996 | McBride et al. | | 6,202,250 B1 | 3/2001 | Kenmochi et al. |
| 5,514,122 A | 5/1996 | Morris et al. | | 6,202,259 B1 | 3/2001 | Burr et al. |
| 5,514,324 A | 5/1996 | Bachar | | 6,207,602 B1 | 3/2001 | Gessner et al. |
| 5,525,397 A | 6/1996 | Shizuno et al. | | 6,218,593 B1 | 4/2001 | Torimae et al. |
| 5,540,332 A | 7/1996 | Kopacz et al. | | 6,220,999 B1 | 4/2001 | Kugler et al. |
| 5,553,344 A | 9/1996 | Rosenkrantz | | 6,243,909 B1 | 6/2001 | Graham et al. |
| 5,558,713 A | 9/1996 | Siegfried et al. | | 6,245,413 B1 | 6/2001 | Kenmochi et al. |
| 5,562,645 A | 10/1996 | Tanzer et al. | | D445,227 S | 7/2001 | Tintelnot |
| 5,567,472 A | 10/1996 | Siegfried et al. | | 6,293,934 B1 | 9/2001 | Kumasaka |
| 5,569,230 A | 10/1996 | Fisher et al. | | 6,298,517 B1 | 10/2001 | McKay |
| 5,571,537 A | 11/1996 | Geus et al. | | 6,305,046 B1 | 10/2001 | Kingry et al. |
| 5,575,785 A | 11/1996 | Gryskiewicz et al. | | 6,317,917 B1 | 11/2001 | Hsu |
| 5,592,713 A | 1/1997 | Rones | | 6,319,593 B1 | 11/2001 | Kenmochi et al. |
| 5,596,787 A | 1/1997 | Stevens et al. | | 6,330,735 B1 | 12/2001 | Hahn et al. |
| 5,609,255 A | 3/1997 | Nichols | | 6,331,345 B1 | 12/2001 | Kauschke et al. |
| 5,613,263 A | 3/1997 | Nolte | | 6,332,234 B1 | 12/2001 | Graham et al. |
| 5,614,147 A | 3/1997 | Pelley | | 6,332,346 B2 | 12/2001 | Komiya et al. |

| | | | | | |
|---|---|---|---|---|---|
| 6,332,996 B1 | 12/2001 | Dit Picard et al. | 6,840,926 B2 | 1/2005 | Nukina et al. |
| 6,368,609 B1 | 4/2002 | Fontenot et al. | 6,842,936 B2 | 1/2005 | Policicchio et al. |
| 6,380,151 B1 | 4/2002 | Masters et al. | 6,844,066 B2 | 1/2005 | Hamed |
| 6,389,637 B1 | 5/2002 | Hurell | 6,846,448 B2 | 1/2005 | Rymer et al. |
| 6,405,403 B1 | 6/2002 | McKay | 6,851,164 B2 | 2/2005 | Andersen |
| D461,028 S | 7/2002 | Ng | 6,854,911 B2 | 2/2005 | Policicchio et al. |
| D461,029 S | 7/2002 | Ng | 6,866,740 B2 | 3/2005 | Vaders |
| 6,416,697 B1 | 7/2002 | Venturino et al. | 6,871,372 B2 | 3/2005 | Vosbikian et al. |
| 6,423,048 B1 | 7/2002 | Suzuki et al. | 6,878,238 B2 | 4/2005 | Bakken et al. |
| D462,150 S | 8/2002 | Rader et al. | 6,888,044 B2 | 5/2005 | Fell et al. |
| 6,437,214 B1 | 8/2002 | Everett et al. | 6,890,622 B2 | 5/2005 | Adam et al. |
| 6,443,936 B1 | 9/2002 | Hamilton et al. | 6,893,522 B1 | 5/2005 | Crainic |
| 6,454,690 B2 | 9/2002 | Kugler et al. | 6,893,525 B1 | 5/2005 | Schmidt et al. |
| D464,181 S | 10/2002 | Ng | 6,910,823 B2 | 6/2005 | Policicchio et al. |
| 6,458,299 B1 | 10/2002 | Wierer et al. | 6,911,022 B2 | 6/2005 | Steger et al. |
| 6,458,442 B1 | 10/2002 | McKay | 6,911,174 B2 | 6/2005 | Creagan |
| 6,461,086 B1 | 10/2002 | Milanowski et al. | 6,923,798 B2 | 8/2005 | Heden et al. |
| 6,465,378 B2 | 10/2002 | Gessner et al. | 6,939,492 B2 | 9/2005 | Jackson et al. |
| D465,890 S | 11/2002 | Rivera et al. | 6,948,873 B2 | 9/2005 | Policicchio et al. |
| 6,479,061 B2 | 11/2002 | Fontenot et al. | 6,968,591 B2 | 11/2005 | Tanaka |
| 6,484,346 B2 | 11/2002 | Kingry et al. | 6,993,805 B2 | 2/2006 | Prodoehl et al. |
| 6,485,667 B1 | 11/2002 | Tan | 7,013,528 B2 | 3/2006 | Parker et al. |
| 6,503,238 B1 | 1/2003 | Torstensson et al. | 7,024,721 B2 | 4/2006 | McKay |
| 6,511,466 B1 | 1/2003 | Nagami et al. | 7,028,364 B2 | 4/2006 | Policicchio et al. |
| 6,513,184 B1 | 2/2003 | Brown et al. | 7,033,965 B2 | 4/2006 | Takabayashi et al. |
| 6,540,424 B1 | 4/2003 | Hall et al. | 7,039,969 B2 | 5/2006 | Zorzo |
| 6,550,092 B1 | 4/2003 | Brown et al. | 7,096,531 B2 | 8/2006 | Policicchio |
| 6,554,937 B1 | 4/2003 | Kenmochi et al. | 7,137,169 B2 | 11/2006 | Murphy et al. |
| D477,701 S | 7/2003 | Kunkler et al. | 7,144,173 B2 | 12/2006 | Policicchio et al. |
| 6,591,442 B2 | 7/2003 | Kaminstein | 7,163,349 B2 | 1/2007 | Policicchio et al. |
| 6,601,261 B1 | 8/2003 | Holt et al. | 7,175,727 B2 | 2/2007 | Melius |
| 6,606,757 B2 | 8/2003 | Vosbikian et al. | 2002/0042962 A1 | 4/2002 | Willman et al. |
| 6,611,986 B1 | 9/2003 | Seals | 2002/0050016 A1 | 5/2002 | Willman et al. |
| 6,617,490 B1 | 9/2003 | Chen et al. | 2002/0168216 A1 | 11/2002 | Policicchio et al. |
| 6,623,576 B2 | 9/2003 | Mitchell et al. | 2002/0168910 A1 | 11/2002 | Vuillaume et al. |
| D481,184 S | 10/2003 | Clare et al. | 2002/0174500 A1 | 11/2002 | Micciche et al. |
| D482,829 S | 11/2003 | Vosbikian et al. | 2002/0177831 A1* | 11/2002 | Daley et al. ............... 604/385.01 |
| 6,651,290 B2 | 11/2003 | Kingry et al. | 2002/0180092 A1 | 12/2002 | Abba et al. |
| 6,652,498 B1 | 11/2003 | Glasgow et al. | 2002/0193032 A1 | 12/2002 | Newkirk et al. |
| 6,652,798 B1 | 11/2003 | Edvardsson | 2003/0003830 A1 | 1/2003 | Ouederni et al. |
| 6,656,569 B1 | 12/2003 | Roussel et al. | 2003/0009839 A1 | 1/2003 | Streutker et al. |
| 6,659,670 B1 | 12/2003 | Blouse | 2003/0024062 A1 | 2/2003 | McKay |
| 6,663,306 B2 | 12/2003 | Policicchio et al. | 2003/0028988 A1 | 2/2003 | Streutker et al. |
| 6,664,438 B1 | 12/2003 | Guidotti | 2003/0041953 A1 | 3/2003 | Farell et al. |
| 6,669,391 B2 | 12/2003 | Policicchio et al. | 2003/0044569 A1 | 3/2003 | Kacher et al. |
| 6,681,434 B2 | 1/2004 | Smith | 2003/0045197 A1 | 3/2003 | Kakiuchi et al. |
| D486,616 S | 2/2004 | Hall et al. | 2003/0049407 A1 | 3/2003 | Kacher et al. |
| D487,173 S | 2/2004 | Clare et al. | 2003/0070746 A1 | 4/2003 | Woods et al. |
| 6,684,445 B1 | 2/2004 | Rios et al. | 2003/0082358 A1 | 5/2003 | Wenstrup |
| 6,687,943 B2 | 2/2004 | Zorzo | 2003/0106568 A1 | 6/2003 | Keck et al. |
| 6,692,172 B1 | 2/2004 | Hsu | 2003/0110584 A1 | 6/2003 | Clare et al. |
| 6,692,603 B1 | 2/2004 | Lindsay et al. | 2003/0114067 A1 | 6/2003 | Matela et al. |
| 6,701,567 B2 | 3/2004 | Smith | 2003/0119400 A1 | 6/2003 | Beitz et al. |
| 6,705,792 B2 | 3/2004 | Smith | 2003/0119401 A1 | 6/2003 | Chakravarty et al. |
| 6,710,099 B2 | 3/2004 | Cinelli et al. | 2003/0119402 A1 | 6/2003 | Melius et al. |
| 6,710,225 B1 | 3/2004 | Everett et al. | 2003/0120238 A1 | 6/2003 | Gustavsson et al. |
| 6,716,206 B2 | 4/2004 | Jackson | 2003/0126710 A1 | 7/2003 | Policicchio et al. |
| 6,717,029 B2 | 4/2004 | Baker | 2003/0135181 A1 | 7/2003 | Chen et al. |
| 6,723,892 B1 | 4/2004 | Daley et al. | 2003/0140441 A1 | 7/2003 | Stafford |
| 6,737,009 B2 | 5/2004 | Taylor et al. | 2003/0157856 A1 | 8/2003 | Schroeder et al. |
| 6,743,318 B2 | 6/2004 | Vaders | 2003/0180083 A1 | 9/2003 | Hall et al. |
| 6,745,434 B2 | 6/2004 | Smith et al. | 2003/0195485 A1 | 10/2003 | Rangachari et al. |
| 6,750,165 B2 | 6/2004 | Kakiuchi et al. | 2003/0200991 A1 | 10/2003 | Keck et al. |
| 6,766,552 B1 | 7/2004 | Policicchio et al. | 2003/0203162 A1 | 10/2003 | Fenwick et al. |
| D494,721 S | 8/2004 | Kotani | 2003/0203691 A1 | 10/2003 | Fenwick et al. |
| 6,781,027 B2 | 8/2004 | Fenwick et al. | 2003/0211802 A1 | 11/2003 | Keck et al. |
| 6,783,722 B2 | 8/2004 | Taylor | 2003/0219591 A1 | 11/2003 | Bany et al. |
| D497,699 S | 10/2004 | Chi-Hsiang et al. | 2003/0220039 A1 | 11/2003 | Chen et al. |
| 6,802,833 B2 | 10/2004 | Kudo | 2003/0221274 A1 | 12/2003 | Makhija et al. |
| 6,803,334 B2 | 10/2004 | Mizutani et al. | 2003/0224686 A1 | 12/2003 | Andersen |
| 6,807,702 B2 | 10/2004 | Keck et al. | 2003/0227106 A1 | 12/2003 | Fuller et al. |
| 6,810,554 B2 | 11/2004 | McKay | 2003/0229327 A1* | 12/2003 | Imsangjan et al. ........ 604/385.01 |
| 6,811,338 B1 | 11/2004 | Manske, Jr. et al. | 2003/0236510 A1 | 12/2003 | Yasumura et al. |
| 6,811,642 B2 | 11/2004 | Ochi | 2004/0011382 A1 | 1/2004 | Kingry et al. |
| 6,813,799 B2 | 11/2004 | Otsuji et al. | 2004/0019995 A1 | 2/2004 | Kowalski et al. |
| 6,813,801 B2 | 11/2004 | Tanaka et al. | 2004/0031119 A1 | 2/2004 | McKay |
| 6,814,519 B2 | 11/2004 | Policicchio et al. | 2004/0038008 A1 | 2/2004 | Levine et al. |
| 6,815,058 B2 | 11/2004 | Watanabe et al. | 2004/0043214 A1 | 3/2004 | Topolkaraev et al. |
| 6,818,166 B2 | 11/2004 | Edwardson et al. | 2004/0049166 A1 | 3/2004 | Chen et al. |

| | | | | | |
|---|---|---|---|---|---|
| 2004/0054331 A1 | 3/2004 | Hamilton et al. | 2005/0045296 A1 | 3/2005 | Adam et al. |
| 2004/0064119 A1 | 4/2004 | Guidotti et al. | 2005/0054253 A1 | 3/2005 | Minoguchi et al. |
| 2004/0074520 A1 | 4/2004 | Truong et al. | 2005/0055791 A1 | 3/2005 | Lin |
| 2004/0087928 A1 | 5/2004 | Ducker | 2005/0061356 A1 | 3/2005 | Wong et al. |
| 2004/0093678 A1 | 5/2004 | Hart et al. | 2005/0079361 A1 | 4/2005 | Hamed et al. |
| 2004/0102124 A1 | 5/2004 | Suzuki | 2005/0081888 A1 | 4/2005 | Pung et al. |
| 2004/0111817 A1 | 6/2004 | Chen et al. | 2005/0085150 A1 | 4/2005 | Hamed |
| 2004/0121686 A1 | 6/2004 | Wong et al. | 2005/0092417 A1 | 5/2005 | Billgren et al. |
| 2004/0128786 A1* | 7/2004 | Policicchio et al. ............ 15/228 | 2005/0109442 A1 | 5/2005 | Neubauer et al. |
| 2004/0140048 A1 | 7/2004 | Lindsay et al. | 2005/0109449 A1 | 5/2005 | Scott et al. |
| 2004/0177863 A1 | 9/2004 | McKay | 2005/0112980 A1 | 5/2005 | Strandqvist et al. |
| 2004/0177935 A1 | 9/2004 | Hamed et al. | 2005/0113775 A1* | 5/2005 | English et al. ........... 604/385.01 |
| 2004/0192136 A1 | 9/2004 | Gusky et al. | 2005/0113776 A1 | 5/2005 | Venturino et al. |
| 2004/0204697 A1 | 10/2004 | Litvay | 2005/0113791 A1 | 5/2005 | Neubauer et al. |
| 2004/0206372 A1 | 10/2004 | Holt et al. | 2005/0118399 A1 | 6/2005 | Perneborn |
| 2004/0206464 A1 | 10/2004 | Li et al. | 2005/0118916 A1 | 6/2005 | Ducker et al. |
| 2004/0234760 A1 | 11/2004 | Hamed | 2005/0120497 A1* | 6/2005 | Lynde et al. ............... 15/104.94 |
| 2004/0253892 A1 | 12/2004 | Baker et al. | 2005/0130539 A1 | 6/2005 | Allen et al. |
| 2004/0253893 A1 | 12/2004 | Castellani | 2005/0132518 A1 | 6/2005 | Chen et al. |
| 2004/0253894 A1 | 12/2004 | Fell et al. | 2005/0138749 A1 | 6/2005 | Keck et al. |
| 2004/0254551 A1 | 12/2004 | Carnes et al. | 2005/0155630 A1 | 7/2005 | Kilkenny et al. |
| 2005/0000047 A1 | 1/2005 | Kelly et al. | 2005/0166347 A1 | 8/2005 | Fereshtehkhou et al. |
| 2005/0004541 A1 | 1/2005 | Roberts | 2005/0170728 A1 | 8/2005 | Crainic |
| 2005/0039287 A1 | 2/2005 | Moser | | | |

* cited by examiner

SURFACE CLEANING PAD HAVING ZONED ABSORBENCY AND METHOD OF MAKING SAME

FIELD OF THE INVENTION

The present invention relates to an absorbent surface cleaning pad, such as a floor cleaning pad, and to a method for fabricating the surface cleaning pad in such a way as to provide zoned absorbency.

BACKGROUND OF THE INVENTION

Conventional floor mops comprise a handle rotatably connected to a mop head and a disposable absorbent cleaning sheet coupled to the mop head. One side of the disposable absorbent cleaning sheet is placed in direct contact with a surface to be cleaned and the opposing side of the cleaning sheet is coupled to the mop head. The cleaning sheet absorbs and retains fluids, and loosens and traps dirt particles on the cleaning surface.

The cleaning sheet may comprise an absorbent portion that includes superabsorbent polymer (SAP) particles. The SAP particles can escape from the absorbent portion during manufacture, shipment, and normal use conditions. This phenomenon is commonly referred to as particle shake-out. A reduction in the amount or volume of SAP particles within the cleaning sheet hinders the performance and decreases the absorbency rating of the cleaning sheet.

Attempts have been made to overcome this problem in other fields such as the field of baby diapers, adult incontinence products, sanitary napkins and the like. For example, an absorbent structure for such products is disclosed in U.S. Pat. No. 6,562,742, which illustrates a diaper absorbent body with SAP particles placed in discrete locations or zones within the structure. According to the disclosure of U.S. Pat. No. 6,562,742, which is incorporated herein by reference in its entirety, superabsorbent polymer particles are placed in at least one strata of an upper ply in longitudinal discrete lanes along the length of the core, and the lanes are separated by adjacent lanes including fibers and a binder. Such a discrete placement of SAP particles is disclosed to allow for better containment of the particles, facilitate flow of liquid in the Z-direction because of the presence of areas with little or no SAP, and allow for easier flow and wicking of the fluid along the length of the core (x-direction). The areas with little or no SAP particles may be additionally densified to improve integrity and create higher capillary tension within smaller pores.

Nevertheless, there continues to be a need for an improved absorbent cleaning pad, such as a floor cleaning pad, and an improved method for fabricating the cleaning pad in such a way as to provide zoned absorbency.

SUMMARY OF THE INVENTION

According to one aspect of the invention, a surface cleaning pad is provided having a pad body with a cleansing surface configured for contact with a surface to be cleaned and an opposed surface configured to be coupled to a cleaning implement. The cleansing surface and the opposed surface together define a thickness of the pad body. The surface cleaning pad also has superabsorbent polymer particles maintained within a zone of the pad body. The zone of the pad body occupies the thickness of the pad body and an area that is contiguous yet less than that of the cleansing surface.

According to another aspect of the invention, a method is provided for forming a surface cleaning pad body having a matrix web of binder fibers and superabsorbent polymer particles. The method includes depositing a mass of binder fibers onto a conveyor. All but a selected area of the mass of binder fibers is shielded, and superabsorbent polymer particles are deposited onto the selected area of the mass of binder fibers so as to disburse superabsorbent polymer particles throughout a thickness of the mass of binder fibers. The mass of binder fibers is formed into a web structure that substantially contains the superabsorbent polymer particles, thereby providing a cleaning pad body with superabsorbent polymer particles substantially contained in a zone of the mass of binder fibers that occupies the thickness of the mass of binder fibers and the selected area. An attachment device is applied to the cleaning pad body, thereby configuring the pad body for attachment to a cleaning implement.

According to yet another aspect of the invention, a method is provided for forming cleaning pad bodies. The method includes forming a substrate of fibers. Superabsorbent polymer particles are applied to the substrate in zones extending along the substrate separated by a gap extending along the substrate. The substrate is parted along the gap to form substrate portions each having an edge portion substantially devoid of superabsorbent polymer particles. The substrate is parted substantially perpendicular to the gap to form cleaning pad bodies.

BRIEF DESCRIPTION OF THE DRAWINGS

Exemplary embodiments of the invention will be described with reference to the drawings, of which.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention. Also, the embodiments selected for illustration in the figures are not shown to scale and are not limited to the proportions shown.

As used herein, the term "superabsorbent polymer (SAP) particle" refers to any absorbent material having a g/g capacity for water of at least about 20 g/g, when measured under a confining pressure of 0.3 psi. Non-limiting examples of suitable superabsorbent materials include water insoluble, water-swellable superabsorbent gelling polymers which are described in U.S. application Ser. No. 09/831,480, the disclosure of which is incorporated herein by reference in its entirety.

Referring to the overall structure of one exemplary embodiment, FIGS. 1-4 illustrate an absorbent cleaning pad designated generally by the numeral "110". Generally, the absorbent cleaning pad 110 has a pad body formed from an airlaid composite and having a cleansing surface configured for cleansing contact with a surface to be cleaned and an opposite surface configured to be positioned facing, or attached to, a cleaning implement. The surface cleaning pad also has a barrier adhered to and substantially covering the opposite surface of the pad body and a pair of scrubbing members adhered to the cleansing surface of the pad body.

More specifically, the exemplary absorbent cleaning pad (or sheet) 110 is provided with an airlaid composite 120. Two folded dirt entrapment members 125 are adhered to a cleaning side 152 of the airlaid composite 120 by an adhesive 130 and extend along the length of the airlaid composite 120. A barrier layer 140 is adhered to an opposing attachment side 155 of the airlaid composite 120 and is folded around the width-wise sides 124 of the airlaid composite 120, thereby enclosing the width-wise sides 124 of the airlaid composite 120. Two attachment members 145 are adhered to the barrier layer 140 by an adhesive 130.

The airlaid composite 120 of the exemplary embodiment absorbs and retains fluids and/or other matter residing on a cleaning surface. The cleaning side 152 of the cleaning pad 110 is in direct contact with the floor surface, and the opposing attachment side 155 of the absorbent cleaning pad 110 is in contact with a cleaning implement such as a mop head (not shown). The dirt entrapment members 125 serve to facilitate the removal of soils from the surface being cleaned by contacting and trapping larger soil particles. The barrier layer 140 substantially prevents fluid from passing from the airlaid composite 120 to the cleaning implement, to keep the cleaning implement substantially free of fluid. The barrier layer 140 also substantially prevents absorbent particles within the airlaid composite 120 from escaping out of the exposed width-wise sides 124 of the airlaid composite 120.

The attachment members 145 provide a single attachment mechanism that can be used to temporarily couple the absorbent cleaning pad 110 to a cleaning implement such as a mop head. In this exemplary embodiment, the attachment members 145 are composed of loop fastening material available from Velcro USA Inc. of Manchester, N.H., USA. Additional benefits and features of attachment mechanisms are disclosed in U.S. application Ser. No. 11/241,438, filed concurrently herewith. The disclosure of U.S. application Ser. No. 11/241,438 is incorporated herein by reference in its entirety. Also, benefits and features of additional optional components, such as cuff components, are disclosed in U.S. application Ser. No. 11/240,949 and U.S. application Ser. No. 11/241,437, filed concurrently herewith, which are incorporated herein by reference in their entirety.

The exemplary embodiment of the absorbent cleaning pad 110 comprises a unitized airlaid composite 120 having an absorbent core composed of at least binder fibers, absorbent fibers and superabsorbent polymer (SAP) particles 150. The absorbent core should be of sufficient integrity to ensure that the absorbent core does not deform and exhibit discontinuities during its normal use in cleansing a surface. The SAP particles 150 provide the airlaid composite 120 with increased absorbency, while the binder and absorbent fibers form the overall structure of the airlaid composite 120. In this embodiment, the binder fibers are optionally bi-component fibers and the absorbent fibers are optionally cellulosic fibers.

The absorbency portion of the airlaid composite 120 may optionally be composed of pulp fibers, rayon fibers, superabsorbent fibers, a combination of superabsorbent and pulp fibers, a combination of superabsorbent and rayon fibers, a combination of pulp, superabsorbent and rayon fibers, a nonwoven web and a in-situ (liquid) superabsorbent, a tissue and in-situ (liquid) superabsorbent, a pulp and in-situ (liquid) superabsorbent, rayon fibers and a in-situ (liquid) superabsorbent, pulp, rayon fibers and a in-situ (liquid) superabsorbent, or a combination thereof of any of the above. The absorbent core component is an essentially hydrophilic material capable of absorbing and retaining fluids. The absorbent component may be composed of fibers, powders, and polymeric binders, any of which may be natural or synthetic.

The exposed sides of the airlaid composite 120 may be sealed or covered to substantially limit the SAP particles 150 from escaping out of the exposed sides of the airlaid composite 120. According to exemplary embodiments of this invention, however, to prevent the escapement of the SAP particles 150, the SAP particles may be concentrated or zoned an adequate distance away from one or more of the exposed sides of the airlaid composite 120. The matrix web of binder fibers would substantially inhibit the zoned SAP particles from migrating a significant distance toward the exposed sides of the airlaid composite 120. An example of a zoned SAP region is illustrated in FIG. 1.

Additional benefits and features of an airlaid composite construction are disclosed in U.S. application Ser. No. 11/240,929, filed concurrently herewith. The disclosure of U.S. application Ser. No. 11/240,929 is incorporated herein by reference in its entirety.

In addition to airlaid composites, other absorbent pad body materials, structures and/or processes are contemplated as well. For example, in another exemplary embodiment an absorbent core prepared by expanding a polymer tow, disclosed in International Publication No. WO 2004/017883, is also contemplated for use as an absorbent pad. The disclosure of International Publication No. WO 2004/017883 is incorporated herein by reference in its entirety. In this exemplary embodiment, the absorbent core comprises a plurality of filaments in the form of an expanded tow, and a layer comprising a liquid superabsorbent material on surfaces of the filaments. The liquid superabsorbent polymer may be applied to the expanded tow, for example, by spraying or by application using a gravure roller. In this embodiment, the liquid superabsorbent polymer is applied to a portion(s) of the width and/or the length of the expanded tow.

Figure 1:
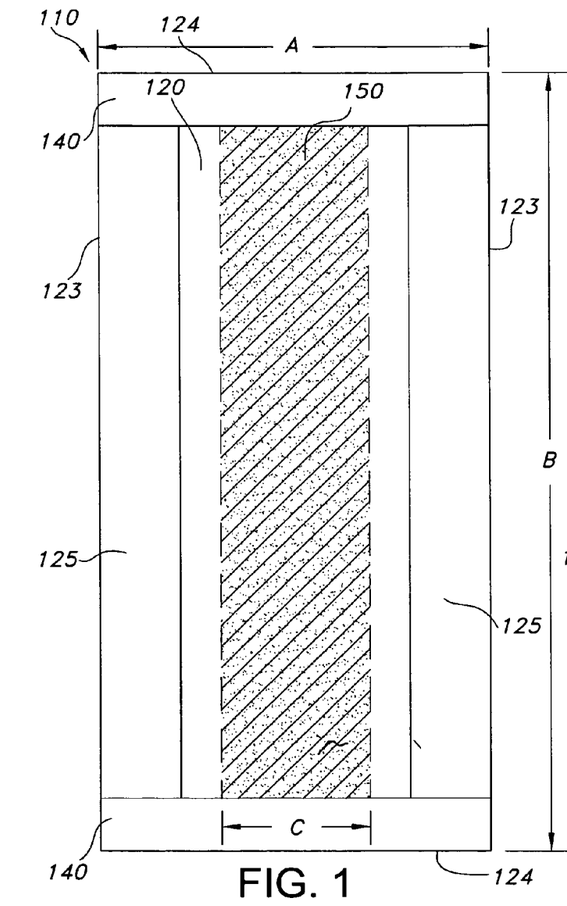
FIG. 1 is a bottom view of an absorbent cleaning pad in accordance with an exemplary embodiment of the present invention.
Figure 2:
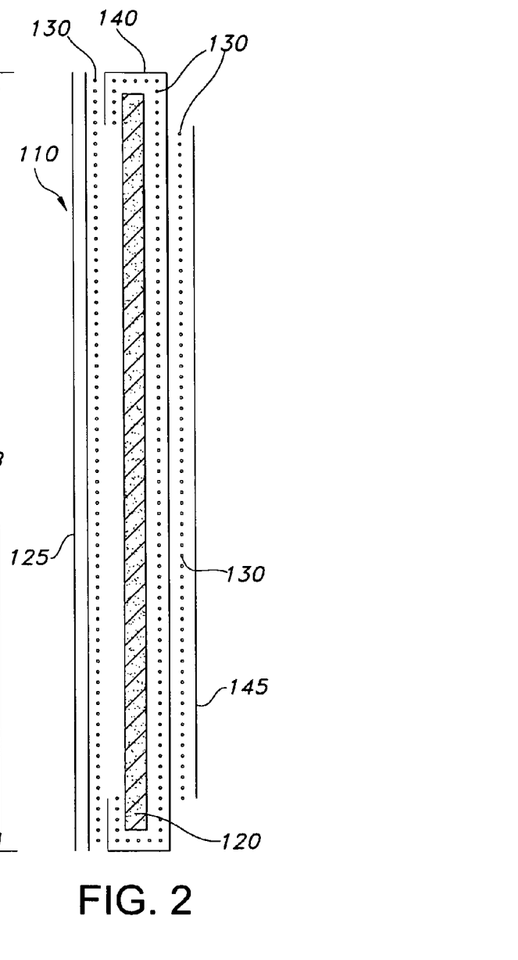
FIG. 2 is a right side view of the absorbent cleaning pad illustrated in FIG. 1.
Figure 3:
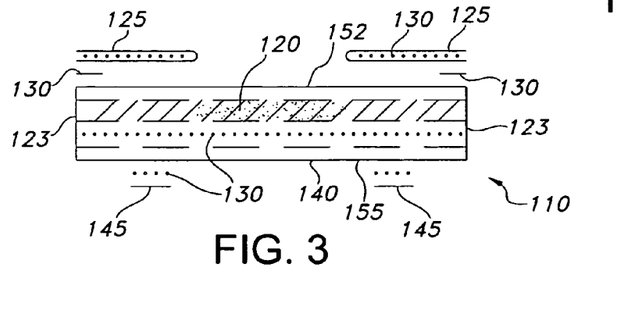
FIG. 3 is an end view of the absorbent cleaning pad illustrated in FIG. 1.

Referring now to FIGS. 1-4, specifically FIG. 1, the SAP particles 150 are dispersed in a discrete zone of the airlaid composite 120. The SAP particles 150 are substantially concentrated in the center of the width of the airlaid composite 120 to substantially limit the SAP from escaping out of the open length-wise sides 123 of the airlaid composite 120. The discrete SAP zone 150 comprises the width "C", the length "B" and the thickness of the airlaid composite 120. Although the SAP particle 150 zone is contiguous with the exposed width-wise sides 124 of the airlaid composite, the portion of the barrier layer folded over the width-wise sides 124 substantially prevents the escapement of SAP 150 out of the exposed width-wise sides 124.

Figure 4:
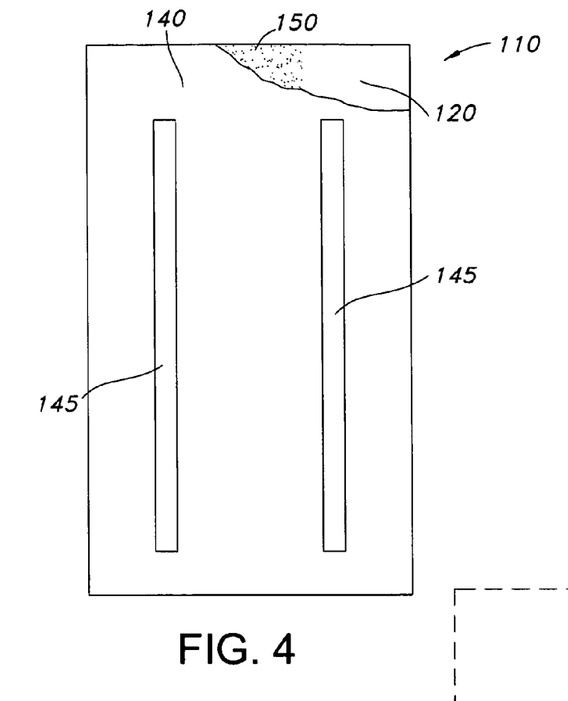
FIG. 4 is a top view of the absorbent cleaning pad illustrated in FIG. 1, including a cut-away portion of the cleaning pad.

The SAP particles 150 are also substantially prevented from escaping through the cleaning side 152 and the attachment side 155 of the airlaid composite. The dense web of binder fibers at the cleaning side 152 and the attachment side 155 of the airlaid composite substantially prevents the SAP particles 150 from escaping. In addition, the barrier layer 140 substantially prevents the SAP particles 150 from escaping out of the attachment side 155 of the airlaid composite 120, as illustrated in FIG. 4.

The exemplary embodiment provides several advantages. The zoned SAP particles reduce particle shake out, gel blocking, and manufacturing costs and promote efficient fluid absorption throughout the airlaid composite. SAP particle shake-out hinders the performance of the cleaning pad and degrades the cleaning pad's absorbency rating. By virtue of the zoned SAP, the exemplary cleaning pad 110 can retain a greater number of SAP particles within the airlaid composite.

The discrete placement of SAP particles also facilitates the flow of fluid along the regions of the cleaning pad devoid of SAP particles. The regions without SAP particles promote flow and wicking of fluid along the entire length and width of the exemplary airlaid composite. Therefore, the discrete placement of SAP particles promotes the utilization of the entire airlaid composite for absorption.

The discrete placement of SAP particles also substantially reduces gel blocking within the airlaid composite, thereby improving the cleaning pad's ability to absorb and retain fluid. Gel blocking leads to the inhibition of fluid flow throughout the entire airlaid composite, thereby reducing the absorbency rating of the cleaning pad. In other words, the airlaid composite cannot efficiently absorb fluid if too many SAP particles are positioned or concentrated on the cleaning surface of the airlaid composite, as the swelled SAP particles prevent the fluid from traveling in the z-direction (i.e., along the thickness of the airlaid composite). The discrete placement of SAP particles promotes uniform fluid absorption throughout the exemplary airlaid composite.

From the manufacturing perspective, by virtue of the SAP zone 150 illustrated in FIGS. 1-4, the barrier layer 140 does not have to be folded over the length-wise sides 123 of the airlaid composite 120, as there is no need to prevent SAP particles 150 from escaping out of the length-wise sides 123. The cleaning pad 110 therefore utilizes less barrier layer material and does not require the additional operation of folding the barrier layer over the length-wise sides 123 of the airlaid composite 120. This represents a cost savings to the manufacturer by way of reduced barrier layer material expense and labor or equipment expense.

Figure 5A:
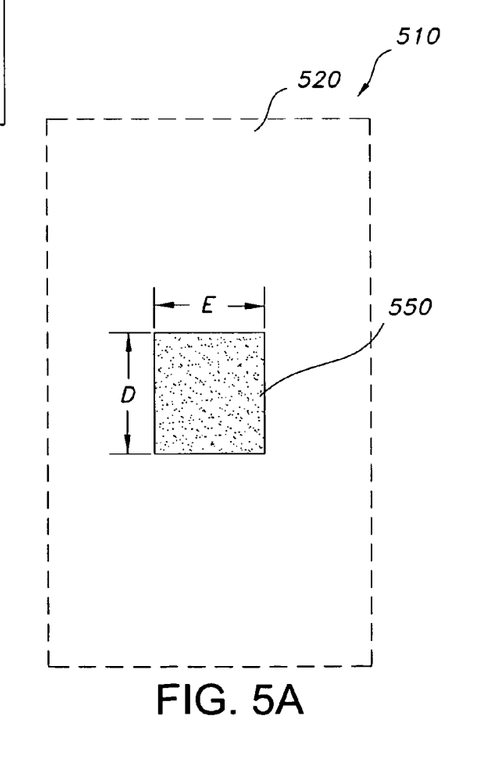
FIG. 5a is a bottom view of an absorbent cleaning pad in accordance with another exemplary embodiment of the present invention.

Another exemplary embodiment of a cleaning pad 510 is illustrated in FIG. 5*a*. The SAP particle zone 550 is provided in a central region of the airlaid composite 520, remote from the entire periphery of the airlaid composite 520. The SAP particle zone 550 may adopt any form, e.g. square as shown, circular, rectangular, semicircular, etc. The outline of the airlaid composite 520 is shown in dotted line form to indicate that the airlaid composite 520 has no boundaries and that the zone 550 can be provided in any desired shape or configuration. In other words, the length and width of the airlaid composite may be any dimension larger than the length "D" and width "E" of the superabsorbent particle 550 zone. For example, the airlaid composite 520 of the exemplary embodiment may be an individual cleaning pad or a continuous cleaning sheet composed of a plurality of cleaning pads.

By virtue of the zoned SAP 550, the barrier layer (not shown) of the exemplary embodiment illustrated in FIG. 5*a* does not have to conceal or otherwise cover the exposed length-wise and width-wise sides of the airlaid composite 520 to prevent shake-out of SAP. The zoned SAP particles 550 cannot migrate to the periphery of the airlaid composite, assuming that there is an adequate gap between the SAP particle zone 550 and the periphery of the airlaid composite 520. By zoning the SAP particles away from the periphery of the airlaid composite 520, a material and assembly cost reduction may be realized, as additional barrier layer material does not have to cover the sides of the airlaid composite 520 and the barrier layer folding operations are eliminated.

Figures 5B, 5C:
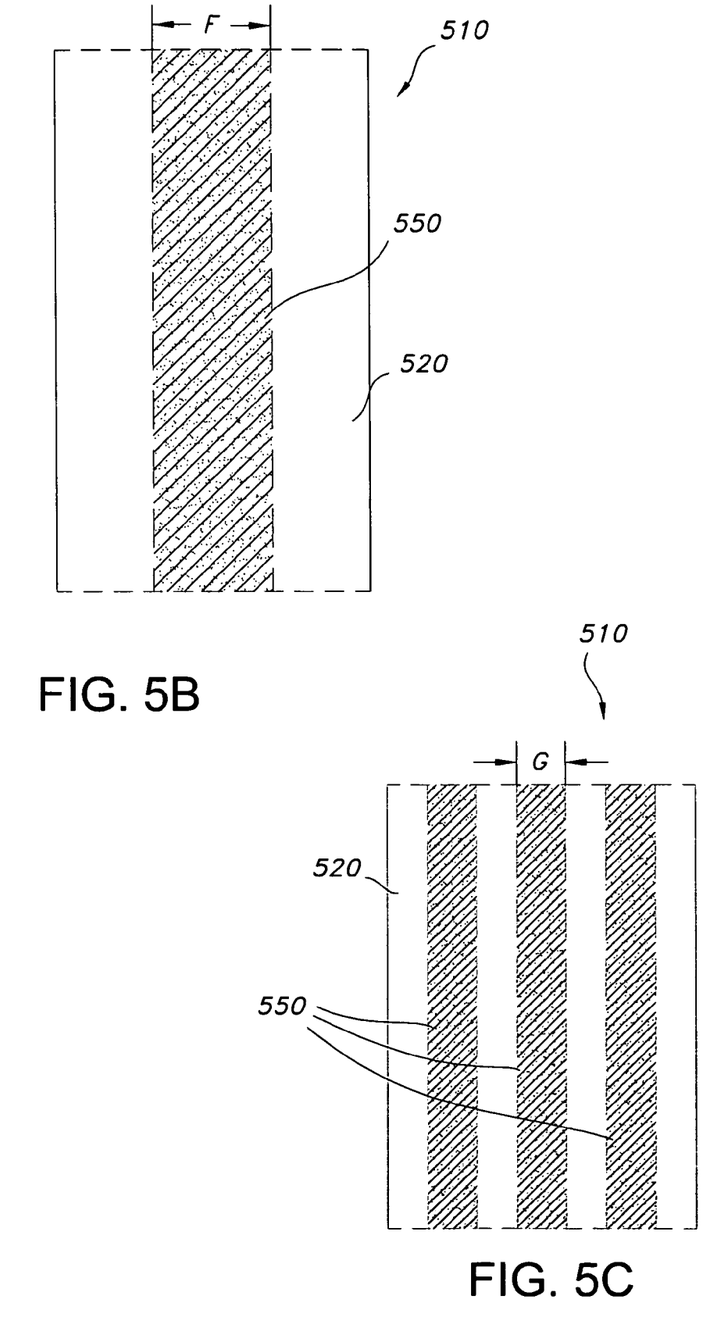
FIG. 5b is a bottom view of an absorbent cleaning pad in accordance with yet another exemplary embodiment of the present invention.
FIG. 5c is a bottom view of an absorbent cleaning pad in accordance with still another exemplary embodiment of the present invention.

Another exemplary embodiment of a cleaning pad 510 is illustrated in FIG. 5*b*. Similar to the exemplary embodiment illustrated in FIG. 1, the SAP particle zone 550 extends along the entire length of the airlaid composite 520. The width-wise sides of the airlaid composite 520 are shown in dotted form to indicate that the length of the airlaid composite 520 is optionally continuous. This exemplary embodiment may optionally represent a continuous airlaid sheet that can be divided, by width-wise cutting or other parting operation, into a plurality of individual airlaid pads.

Another exemplary embodiment of a cleaning pad 510 is illustrated in FIG. 5*c*. Similar to the exemplary embodiment illustrated in FIG. 5*b*, the SAP zone 550 extends along the entire length of the airlaid composite 520. This exemplary embodiment provides multiple zones of SAP particle 550 of width "G". However, the width of the multiple zones of SAP may vary as well, depending upon the fluid distribution and fluid management. The discrete placement of the SAP particle zones 550 facilitates the flow of fluid along the regions of the cleaning pad devoid of SAP particles. The regions without SAP particles promote flow and wicking of the fluid along the length and width of the cleaning pad and limit gel blocking.

Alternatively, the cleaning pad embodiment shown in FIG. 5*c* is provided as an interim substrate or step in forming an absorbent cleaning pad. For example, a method of forming cleaning pad bodies can include forming a substrate of fibers, and then depositing superabsorbent polymer particles to the substrate in zones extending along the substrate separated by one or more gaps extending along the substrate to form the interim cleaning pad substrate 510. The substrate 510 can then be cut or otherwise parted along one or more of the gaps to form substrate portions each having an edge portion substantially devoid of superabsorbent polymer particles. Such an interim substrate 510 can then be parted in a direction substantially perpendicular to the gaps to form cleaning pad bodies. In other words, the substrate 510 can be divided along the gaps between adjacent zones and then cut or parted in a direction substantially perpendicular to the gaps to form shorter lengths, thereby forming a structure corresponding to the absorbent composite 120 used in the absorbent cleaning pad 110 shown in FIGS. 1-4.

Figure 6:
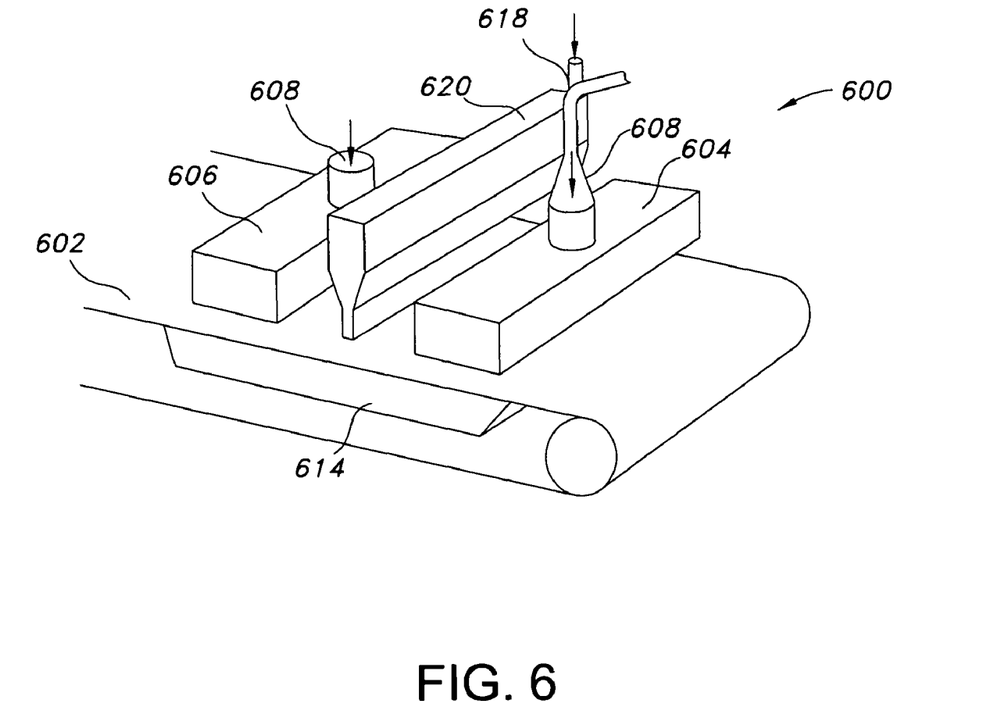
FIG. 6 is a schematic, perspective view of a system that can be used to form an absorbent cleaning pad according to an embodiment of this invention.
Figure 7:
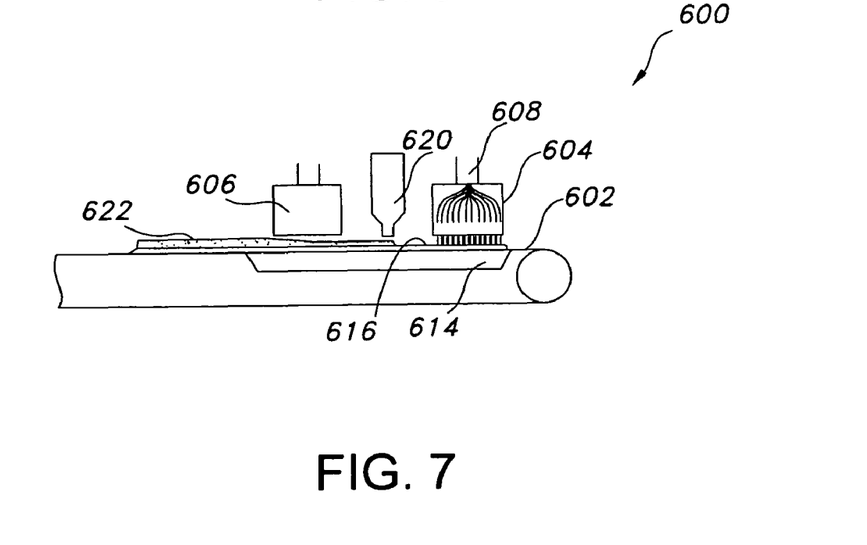
FIG. 7 is a schematic, sectional side view of the system illustrated in FIG. 6.

FIGS. 6 and 7 schematically show an example of an airlaid composite forming system 600 that can be used to form an absorbent cleaning pad according to one aspect of the invention if the pad includes an airlaid composite. It is also contemplated that the absorbent cleaning pad is formed with an alternative structure, including any fibrous or non-fibrous material capable of defining a substrate.

Although only one example of an airlaid composite forming system is illustrated, this invention is not limited to the particular airlaid composite forming system selected for illustration in the Figures, and this invention is not limited to an absorbent pad having an airlaid structure. Other airlaid forming systems and other pad-producing processes are contemplated as well.

The airlaid composite forming system 600 comprises a moving perforated forming wire 602, which acts as a conveyor, with forming head equipment mounted thereabove. In the orientation illustrated in FIGS. 6 and 7, the upper surface of the wire 602 moves from right to left at a rate appropriate for proper distribution of materials on the wire 602. Alternatively, the wire 602 can remain stationary while other equipment (e.g., forming heads) move respect to the wire 602. Nevertheless, a continuous conveyer process such as that illustrated in FIGS. 6 and 7 is advantageous.

Forming heads 604 and 606 each receives a flow of an air fluidized fiber material (e.g., binder fibers, wood pulp, other fibrous materials, or combination thereof) via supply channels 608. A suction source 614 mounted beneath the perforated moving wire 602, draws air downwardly through the perforated moving wire 602. In one embodiment, the binder fiber material is distributed and compacted (by the air flow) over the width of the wire 602 to form an light web layer on the surface of the wire 602. A second forming head (not shown) is provided to distribute a second web layer 616 composed of a mixture of binder fibers and cellulosic fibers onto the light web layer.

The SAP particles are introduced into the particle dispenser 620 through a tube 618. The particle dispenser 620 is configured to direct (e.g., spray, sprinkle, release, etc.) the SAP particles onto the perforated moving wire 602 above the web layer 616. The SAP particles are either distributed over a portion of the width and/or length of the web layer 616 or distributed over the entire web layer 616. The SAP particles blend and disseminate through the web layer 616 and are thereby maintained throughout the entire thickness of the airlaid composite.

A third forming head 606 is provided to distribute another web layer 622 of binder and/or cellulosic fibers over the SAP particles. Although only two forming heads are illustrated, more forming heads may be required to distribute additional layers of binder fiber or cellulosic fiber. Thereafter, the web layers are heated for a period of time until the binder fibers melt together to form a web-like structure, i.e., an airlaid composite.

In functional terms, the first light web layer including binder fibers is oriented toward the cleaning surface and provides structure to the airlaid composite. The second web layer 616 including binder fibers and cellulosic fibers is maintained over the first light web layer and provides structure and absorbency to the airlaid composite. The SAP particles are maintained over the second web layer 616 to provide additional absorbency to the airlaid composite. The third web layer 622 including binder fibers and cellulosic fibers are maintained over the SAP particles and is oriented toward the cleaning implement. The third web layer 622 provides structure and absorbency to the airlaid composite. The web layers collectively form an airlaid composite according to one embodiment.

Although not shown, in yet another exemplary embodiment, a preformed sheet comprising SAP particles may be positioned above the light web layer 616, as an alternative to using the particle dispenser 620. The preformed sheet may be of any size equal to or smaller than the light web layer 616.

Still referring to the airlaid composite forming system illustrated in FIGS. 6 and 7, to form the airlaid composite illustrated in FIG. 5*a*, the SAP particles are distributed above a portion of the length and the width of the web layer 616. The particle dispenser 620 is configured to distribute a volume of SAP particles to a zone of length "D" and width "E" above the web layer 616 to form a single airlaid composite. To form a continuous sheet composed of multiple airlaid composites 520, the particle dispenser 620 is configured to periodically distribute the SAP in zones onto the moving web layer 616. A processing unit (not shown) controls the operation of the particle dispenser 620 and the duration of each SAP distribution period. The duration of each SAP distribution period is dependent upon the speed of the moving wire 602, the length of each individual airlaid composite and the length of the SAP particle zone.

In still another exemplary embodiment and still referring to FIGS. 5*a*, 6, and 7, SAP particles and binder fibers are both introduced into tube 618 of the particle dispenser 620. The particle dispenser 620 therefore distributes both SAP particles and binder fibers over a zone of length "D" and width "E" over the web layer 616. However, it should be understood that the particle dispenser 620 and the forming heads 604 and 606 can distribute any type of fiber or particle or combination thereof, as the dispenser and forming heads are not limited to merely distributing binder fibers and SAP particles.

Still referring to the airlaid composite forming system illustrated in FIGS. 6 and 7, to form the cleaning pad 520 illustrated in FIG. 5*b* the SAP particles 550 are distributed above a segment "F" (as illustrated in FIG. 5*b*) of the web layer 616. The particle dispenser 620 is configured to limit the distribution of the SAP particles 550 over a segment "F" of the web layer 616. In other words, the particle dispenser 620 only sprays, sprinkles, or releases the SAP particles 550 in segment "F".

As an alternative to configuring the particle dispenser 620 to distribute the SAP particles over the segment "F" of the web layer 616, a screen may be positioned above the web layer 616 to limit the placement of the SAP particle zone 550 to a segment "F" of the web layer 616. In this exemplary embodiment, the particle dispenser 620 is configured to distribute the SAP particles over the entire web layer 616, although the screen limits the distribution of the SAP particles to the segment "F" above the web layer 616.

Figure 8:
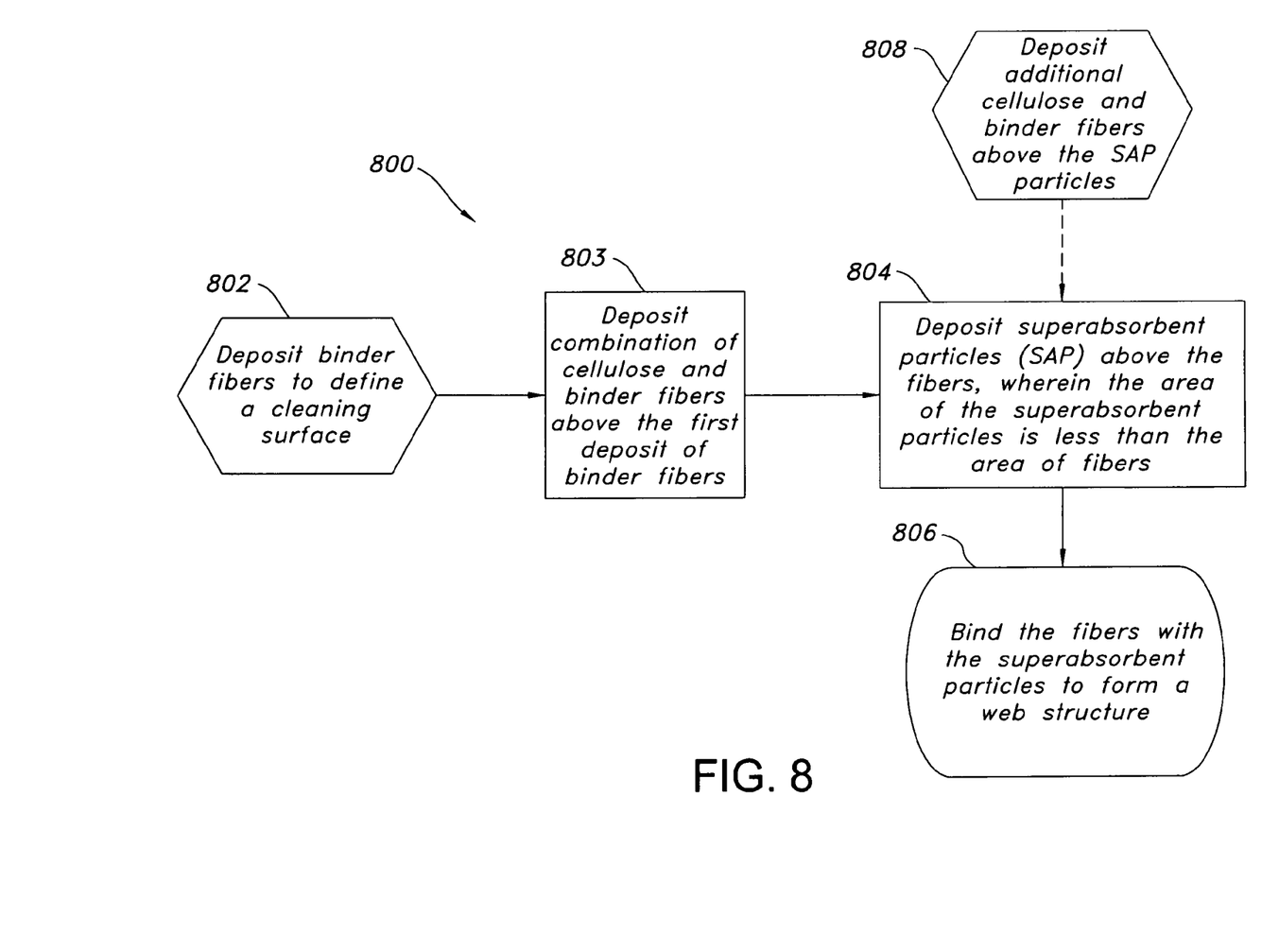
FIG. 8 is a flow chart illustrating exemplary steps of a process for forming an absorbent cleaning pad according to another exemplary embodiment of the invention.

FIG. 8 is a flow chart 800 of exemplary steps for fabricating an airlaid composite in accordance with the present invention. Block 802 illustrates the step of depositing binder fibers onto a moving perforated wire so as to define a cleaning surface of the pad body. Block 803 illustrates the step of depositing both binder and cellulosic fibers above the binder fibers. Block 804 illustrates the step of depositing superabsorbent polymer particles above the binder and cellulosic fibers, wherein an area of the superabsorbent polymer particles is less than an area of binder and cellulosic fibers. Block 808 illustrates the optional step of depositing additional binder fibers above the layer of binder and cellulosic fibers. Block 806 illustrates the final step of bonding the binder fibers with the cellulosic fibers and superabsorbent polymer particles to form a web-like airlaid structure.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention. Also, the embodiments selected for illustration in the figures are not shown to scale and are not limited to the proportions shown.

What is claimed:

1. A surface cleaning pad configured to be coupled to a cleaning implement, said surface cleaning pad comprising:
 a pad body having a cleaning surface configured for contact with a surface to be cleaned and an opposed surface, said cleaning surface and said opposed surface together defining a thickness of said pad body, said pad body comprising width-wise sides;

superabsorbent polymer particles maintained within a zone of said pad body, wherein said zone of said pad body occupies said thickness of said pad body and an area that is contiguous yet less than an area of said cleaning surface of said pad body;

a barrier layer disposed on the opposed surface of the pad body and between the pad body and the cleaning implement, the barrier layer being folded around the width-wise sides of the pad body;

said pad body having a region adjacent said zone, said region being substantially devoid of superabsorbent polymer particles; and dirt entrapment members disposed on the cleaning surface of the pad body, the dirt entrapment members being folded and adhered to the cleaning surface.

2. The surface cleaning pad of claim 1, wherein said pad body is formed from an airlaid composite.

3. The surface cleaning pad of claim 1, wherein said pad body comprises a plurality of substantially continuous and coextensive filaments.

4. The surface cleaning pad of claim 1, wherein said superabsorbent polymer particles are substantially maintained in the center of the thickness of said pad body.

5. The surface cleaning pad of claim 1 further comprising an attachment member coupled to said opposed surface of said pad body and configured for attachment to a cleaning implement.

6. The surface cleaning pad of claim 1, wherein said zone of said superabsorbent polymer particles occupies a portion of a width of said pad body.

7. The surface cleaning pad of claim 6, said zone of said superabsorbent polymer particles occupies a portion of a length of said pad body.

8. A surface cleaning pad comprising:

a pad body having a cleaning surface configured for contact with a surface to be cleaned and an opposed surface configured to be coupled to a cleaning implement, said cleaning surface and said opposed surface together defining a thickness of said pad body, said pad body comprising width-wise sides; and superabsorbent polymer particles maintained within a zone of said pad body, a barrier layer disposed on the opposed surface of the pad body and between the pad body and the cleaning implement, the barrier layer being folded around the width-wise sides of the pad body, wherein said zone of said pad body occupies said thickness of said pad body, said zone of said pad body occupies an area that is contiguous yet less than an area of said cleaning surface of said pad body, and said zone of said pad body is spaced from an edge of said pad body, said pad body having a region adjacent said zone, said region being substantially devoid of superabsorbent polymer particles; and dirt entrapment members disposed on the cleaning surface of the pad body, the dirt entrapment members being folded and adhered to the cleaning surface.

9. The surface cleaning pad of claim 8 further comprising a barrier layer positioned between said pad body and the cleaning implement.

10. The surface cleaning pad of claim 9 further comprising an attachment member positioned on said barrier layer that is configured to be releasably coupled to the cleaning implement.

11. A surface cleaning pad comprising:

a pad body formed from a unitized airlaid composite including superabsorbent polymer particles maintained within a zone of said pad body, said pad body having a cleaning surface configured for contact with a surface to be cleaned and an opposed surface configured to be coupled to a cleaning implement, said cleaning surface and said opposed surface together defining a thickness of said pad body, said pad body comprising width-wise sides;

a barrier layer disposed on the opposed surface of the pad body and positioned between said pad body and the cleaning implement, the barrier layer being folded around the width-wise sides of the pad body, wherein said zone of said pad body occupies said thickness and an area that is contiguous yet less than an area of said cleaning surface of said pad body, said pad body having a region adjacent said zone, said region being substantially devoid of superabsorbent polymer particles, and dirt entrapment members disposed on the cleaning surface of the pad body, the dirt entrapment members being folded and adhered to the cleaning surface.

12. The surface cleaning pad of claim 11 further comprising an attachment member positioned on said barrier layer that is configured to be releasably coupled to the cleaning implement.

13. The surface cleaning pad of claim 1, wherein said region of said pad body encompasses the entire pad body not including said zone.

14. The surface cleaning pad of claim 1 further comprising at least two zones including superabsorbent polymer particles, said at least two zones being separated by said region of said pad body.

15. The surface cleaning pad of claim 1, wherein said region of said pad body occupies said thickness of said pad body.

16. The surface cleaning pad of claim 8, wherein said region of said pad body encompasses the entire pad body not including said zone.

17. The surface cleaning pad of claim 8 further comprising at least two zones including superabsorbent polymer particles, said at least two zones being separated by said region of said pad body.

18. The surface cleaning pad of claim 8, wherein said region of said pad body occupies said thickness of said pad body.

19. The surface cleaning pad of claim 11, wherein said region of said pad body encompasses the entire pad body not including said zone.

20. The surface cleaning pad of claim 11 further comprising at least two zones including superabsorbent polymer particles, said at least two zones being separated by said region of said pad body.

21. The surface cleaning pad of claim 11, wherein said region of said pad body occupies said thickness of said pad body.

* * * * *